Nov. 29, 1927. 1,651,030
A. KOWALSKY
BEET TOPPER
Filed July 5, 1923  4 Sheets-Sheet 1

Inventor.
Andrew Kowalsky,
By H.P. Doolittle
Atty.

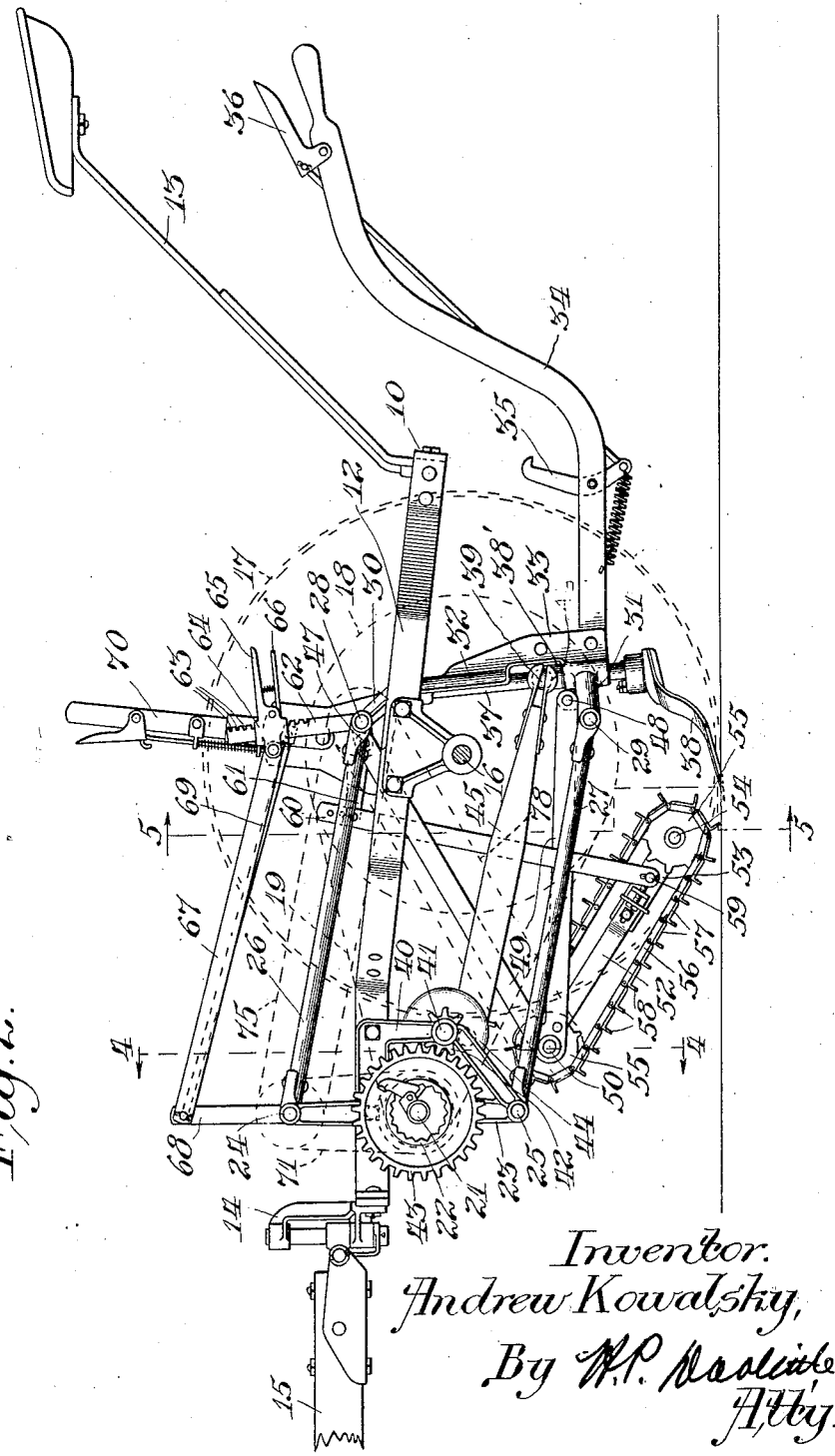

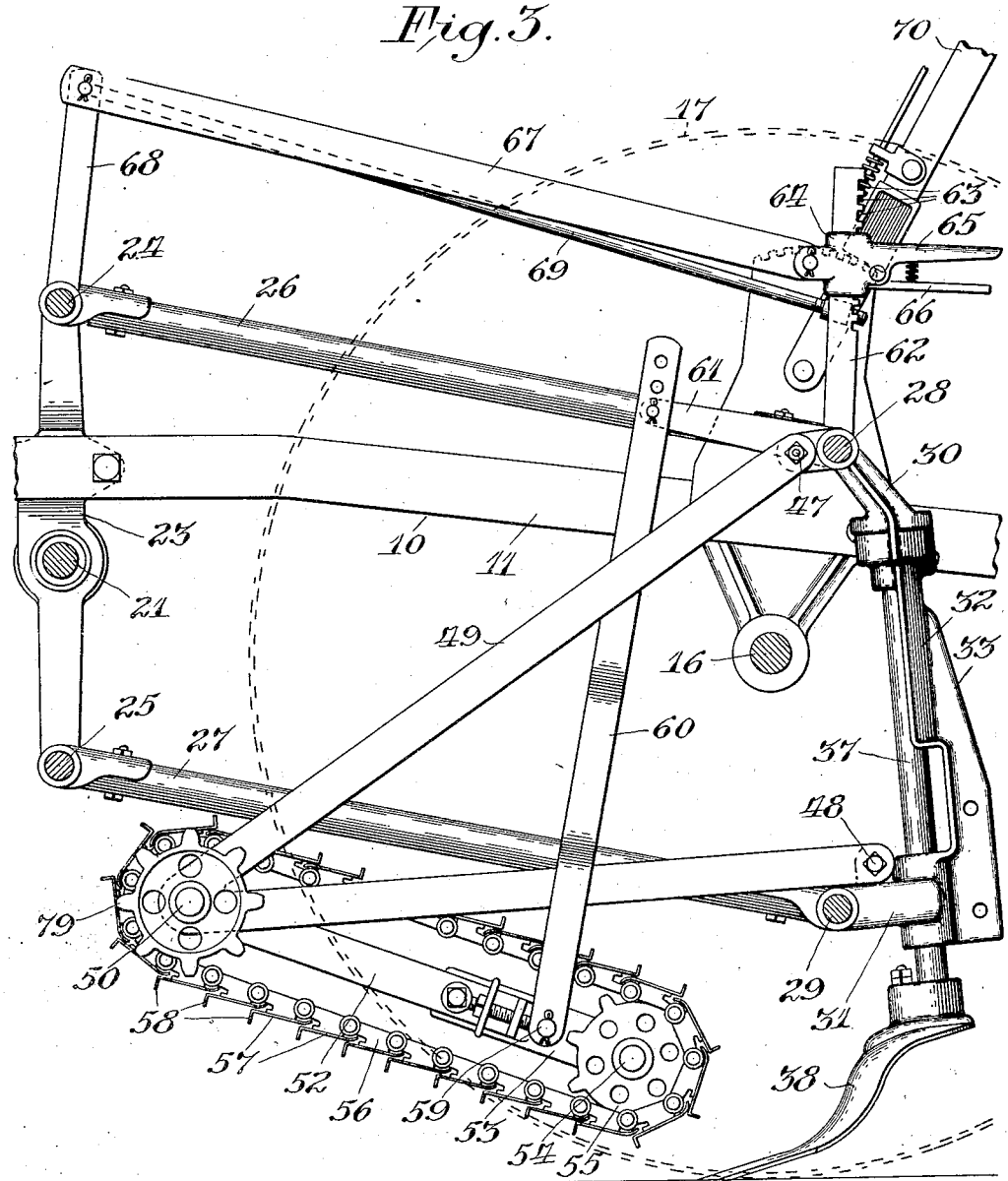

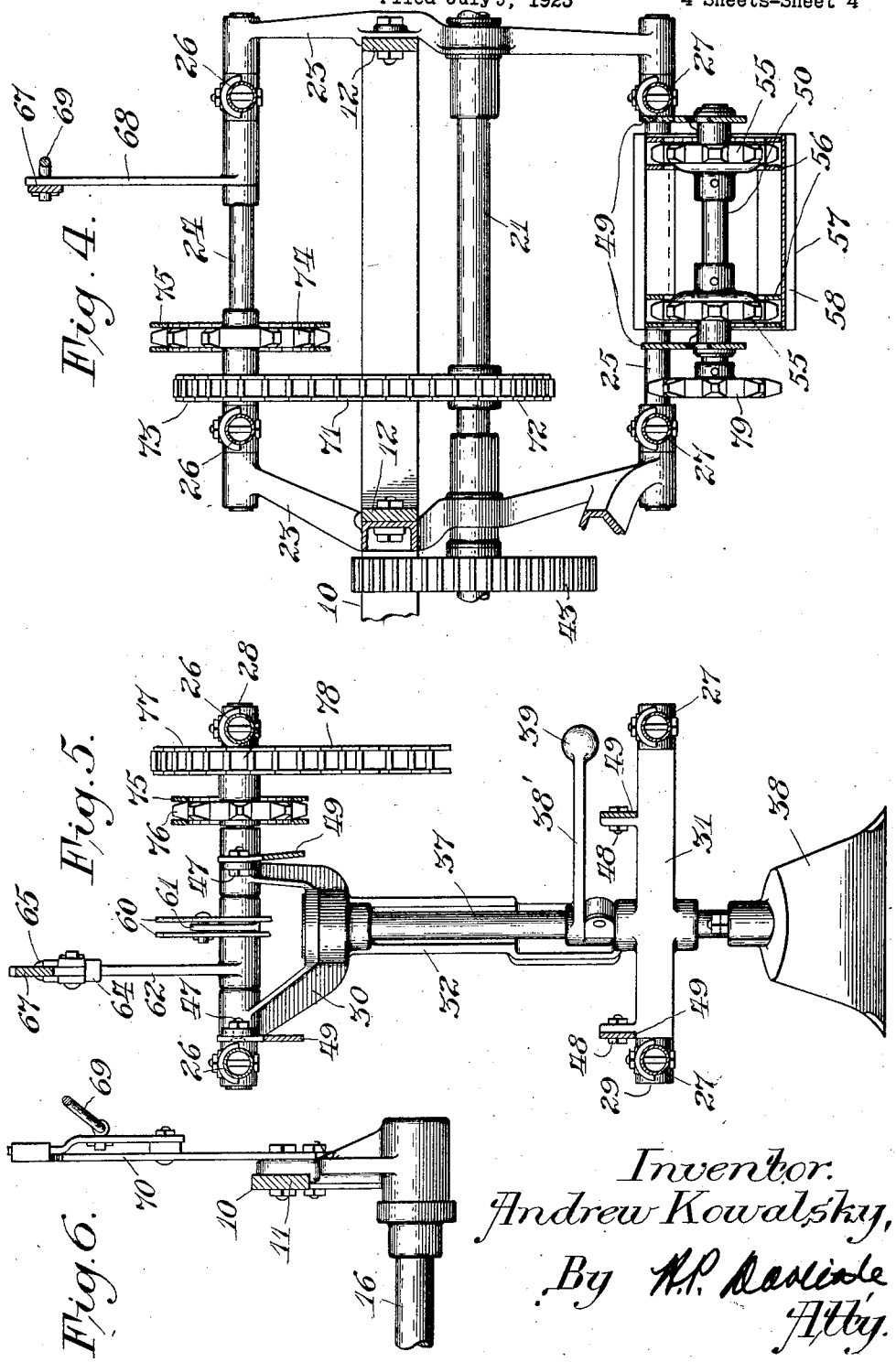

Patented Nov. 29, 1927.

1,651,030

UNITED STATES PATENT OFFICE.

ANDREW KOWALSKY, OF OAK PARK, ILLINOIS, ASSIGNOR TO INTERNATIONAL HARVESTER COMPANY, OF CHICAGO, ILLINOIS, A CORPORATION OF NEW JERSEY.

BEET TOPPER.

Application filed July 5, 1923. Serial No. 649,429.

This invention relates to machines for topping growing beets and is directed to improvement in the mechanism for gaging the cut and for automatically causing more or less of the beet top to be sliced off according to the extent to which the beet and its leaves project above the ground, the height of the beet top and leaves controlling the size of the slice taken off, and the principal object of the invention, therefore, is to simplify the mechanism and improve its accuracy of operation and ease of adjustment and control.

The invention accordingly resides in the novel construction and combination of parts, or the equivalents thereof, hereinafter described and claimed and illustrated in detail in the accompanying drawings where,—

Fig. 2 is a side elevation of the same, one wheel being omitted;

Fig. 3 is an enlarged sectional side view of the topping devices and the supporting elements therefor;

Fig. 4 is a transverse section through the machine on the line 4—4 of Fig. 2;

Fig. 5 is a similar section on the line 5—5 of Fig. 2; and

Fig. 6 is a sectional detail view of the mounting for the main adjusting lever.

Figure 1:
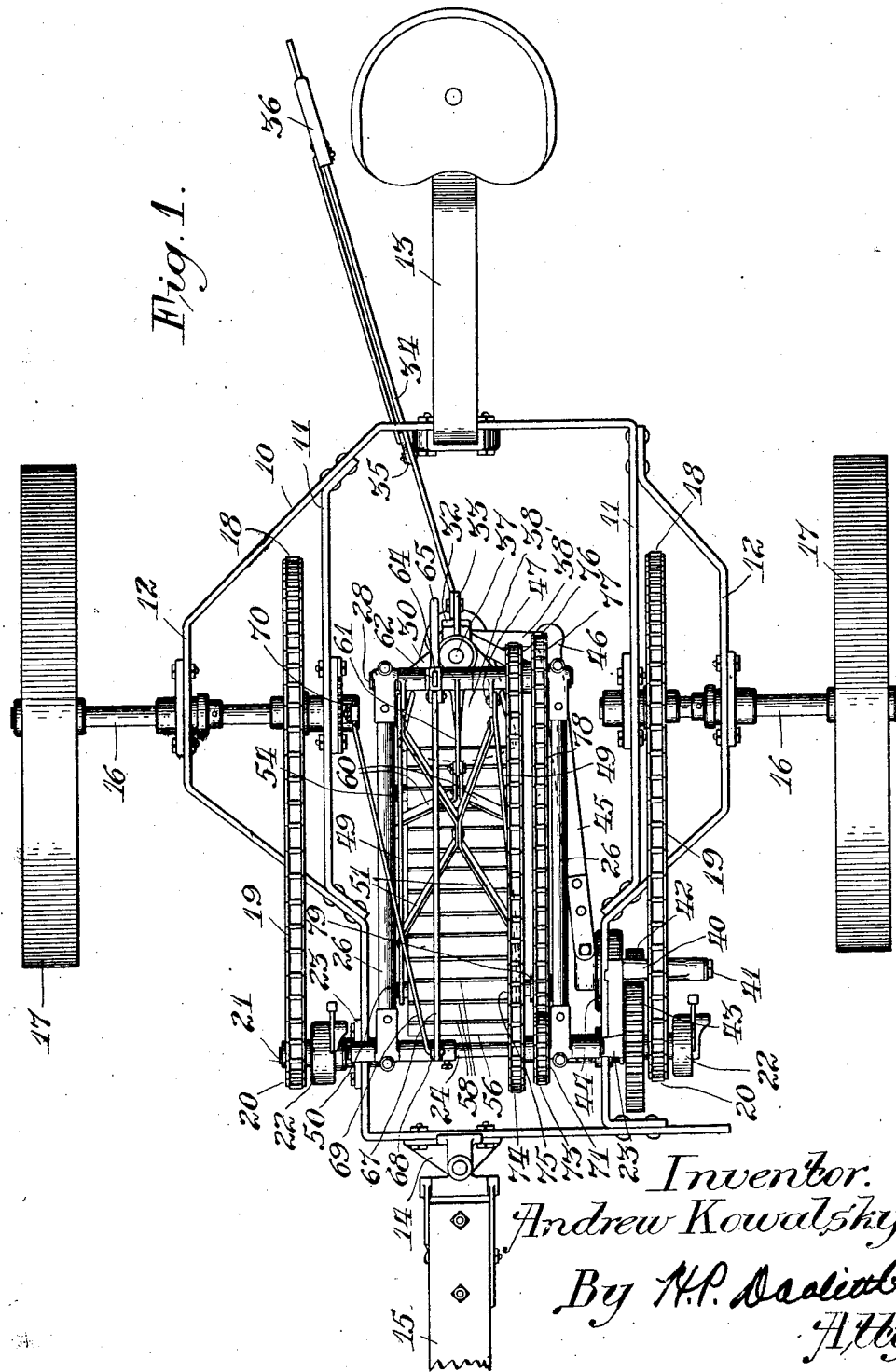
Fig. 1 is a plan view of the machine embodying my invention.

The machine embodying the invention comprises a main frame 10, formed at each side with parallel inner and outer members 11 and 12. A seat post 13 is secured to the rear of the frame, and the front frame bar carries a draft bracket 14 in which there is pivotally mounted the draft tongue 15, preferably by means of the double pivot joint shown, in connection with which suitable means (not shown) for adjusting the angularity and height of the tongue may be provided, as usual in this type of machine. At each side of the frame the members 11 and 12 have journal brackets secured thereto in which are mounted the axles 16 that have fixed thereto the supporting wheels 17. At a point between the members 11, 12, each axle has secured to it a main drive sprocket 18, connected by sprocket chains 19 with sprocket pinions 20 on the ends of a counter-shaft 21 journaled under the front end of the frame. These pinions are connected to shaft 21 by suitable pawl and ratchet clutches 22 to provide a differential drive, and suitable means, not shown, for throwing the drive in and out are provided. The shaft 21 is preferably journaled in the lower arms of bracket members, or castings, 23 (Fig. 3) which are formed with arms projecting above and below the frame where they serve to support the transverse bearing shafts 24, 25, and on these shafts there are pivoted upper and lower pairs of bars 26, 27 which are held in parallel relation vertically and form the main members of a floating frame structure carrying the topping mechanism to be described.

At the rear ends, the bars 26, 27, are connected pivotally by transverse shafts 28, 29, which also serve as bearing shafts for the arms of upper and lower bearing castings, or brackets, 30, 31, connected by a vertically extending housing 32. The shafts 28, 29, connecting the members 26, 27, are, therefore, held in parallel relation by the housing 32 when these parts, constituting the floating frame, move up and down during operation of the machine. As means for shifting the floating frame to and from working position, the housing 32 is formed with a flange or web 33, to which is fixed a lifting arm 34 that extends rearwardly below the frame and then upwardly to a point within reach of the operator occupying the seat on standard 13. Just below the rear frame bar, arm 34 is provided with a spring held dog 35, controlled by a hand piece 36 on the end of arm 34, and adapted to automatically hook over the rear bar of the main frame when the floating frame is lifted by means of arm 34, and to be released by actuation of hand piece 36 when the floating frame is to be let down.

In the brackets 30, 31, and the housing 32, there is journaled an upright knife-shaft 37 which has a forwardly and downwardly extending cutting blade 38 secured to its lower end, this blade being formed with a horizontally disposed arcuate knife edge. Just above the lower bearing bracket 31, the knife-shaft 37 has secured to it a laterally extending operating arm 38' provided with a spherical head 39 on its end (Fig. 5). In a bearing bracket 40, preferably cast as part of one of the arms 23 on the forward portion of the main frame, there is journaled a stub shaft 41 which has fixed to it a pinion 42 that is in mesh with a relatively large drive gear 43 on counter-shaft 21 and stub shaft 41 is accordingly driven at comparatively high speed. At its inner end, stub shaft 41 has fixed to it a crank wheel 44 to which there is eccentrically pivoted the forward end of a pitman 45 that has a suitable bearing 46 at its rear end for reception of the spherical head 39 on the operating arm of the knife-shaft.

The foregoing describes a construction in which there is provided a rapidly oscillating horizontally positioned cutter blade positioned at the ground line and carried on a freely floating supporting frame.

As means for controlling the action of the cutter, the upper and lower brackets 30, 31, of the floating frame carry suitable lugs to which are attached as at 47, 48, (Fig. 3) the ends of two pairs of supporting arms 49 which converge forwardly and downwardly to a point a foot or so above the ground line where their connected ends form bearings for the ends of a shaft 50. The upper pair of arms 49 are preferably connected and securely braced transversely by the cross frame 51 (Fig. 1). The shaft 50 pivotally carries the forward ends of a pair of spaced bars 52 that extend rearwardly towards the cutter, their rear ends being provided with longitudinally adjustable arms 53 which carry a shaft 54 corresponding to shaft 50. The shafts 50 and 54 each have secured thereon sprockets 55 and over these there is trained an endless gage apron 56 which is preferably formed of articulated slats 57 having outwardly extending flanges 58. For the purpose of supporting and adjusting the rear portion of the gage apron, the arms 53 have pins 59 to which are attached a pair of links 60 that converge at the upper ends where they are connected adjustably to the horizontally extending arm 61 of a bell-crank mounted to oscillate on shaft 28. The other arm, 62, of the bell-crank extends upwardly and is provided with a series of notches 63 on its rear edge. It slidably carries a latch sleeve 64 that has a rearwardly projecting hand piece 65 and a spring pressed dog 66 cooperating with notches 63, by means of which the sleeve may be adjusted and locked at any point along arm 62. The sleeve 64 is pivotally connected by bar 67 to a rocking arm 68 on shaft 24 and this arm is connected by a rod 69 to an adjusting lever 70 pivoted on the frame bar 11, this structure providing means for adjusting the height of the rear portion of the gage apron and consequently the depth of cut and also the differential movement of the gage with respect to the cutter.

The apron gage 56 is preferably driven at a speed corresponding approximately to that of travel of the machine and the drive is transmitted to the apron from countershaft 21 through chain 71 which connects a sprocket 72 on shaft 21 with a sprocket 73 directly above it on shaft 24. Sprocket 73 rotates with a sprocket 74 mounted beside it and sprocket 74 is connected by chain 75 with a sprocket 76 on the shaft 28 in the upper rear portion of the floating frame. From this shaft the drive is transmitted to the apron through a sprocket 77, chain 78, and sprocket 79 on the end of shaft 50 which carries the front of the gage apron. By this arrangement of driving elements, the rising and falling movements of the floating frame are not interfered with.

It is to be noted that the construction and arrangement of the floating frame carrying the cutter and gage is such that it will rise and fall as the gage apron rides over the beet-tops, but the important feature of the construction is that there will be a difference in the respective movements of the apron and cutter, that is, the cutter will not move upwardly as fast as the apron and the extent of this differential movement is controlled by the position of sleeve 64 on arm 62. The differential action is due to the fact that as gage 56 rides over a beet top it will raise the whole floating frame with it, but owing to the connection of links 60 with the bell-crank on shaft 28, the arm 62 of which is connected by link 67 to arm 68 that is locked in position by lever 70, the arm 62 will be forced to swing rearwardly as the floating frame rises and arm 61 will swing upwardly, thereby accelerating the upward movement of the gage apron. The amount of this acceleration will, evidently, be greatest when sleeve 64 is at the bottom of arm 62 and grows less as the sleeve 64 is moved up the arm, the adjustment between the gage and blade remaining uniform if link 67 be parallel with bars 26. Adjustment of the differential movement between the gage and cutter can, therefore, be readily made.

In operation of the machine, the supporting wheels straddle the row of growing beets, and as the machine advances the gage apron travels over the beet tops and will rise and fall, together with the floating frame and cutter, according to the height of the beet tops encountered. When a high-growing beet is encountered the apron will rise correspondingly, but the cutter, owing to the novel arrangement of parts above described, will not rise to the same extent as the apron and it will engage the beet at a considerable distance downwardly from its crown, or leaves, and at a point some distance above the ground line, thus severing the top at the correct distance below the leaves which, on a high growing beet, is farther down on the beet than when the beet sets low in the ground. On a low-growing beet the apron will rise but slightly and the cutter will act close to the ground line and at less distance from the beet leaves. It is seen, therefore, that a larger piece will be cut from the top of a high growing beet, but at a higher level from the ground, than from a low growing beet, and as the amount that should be cut off increases in proportion to the height of the beet, the mechanism will operate automatically to control the amount of cut. It is also evident that adjustment of the cut can readily be effected by lever 70 and the extent of differential movement between the blade and gage determined by means of sleeve 64, and that the parallel movement of the main members of the floating frame will preserve the proper positions of the gage and cutter during vertical movement, the cutter blade always operating horizontally.

Having described my invention, what I claim is:

1. In a topping machine, the combination of a supporting frame, a floating frame comprising vertically spaced parallel members pivoted at one end to the supporting frame, a cutter carried by the other end of said members, a vertically movable gage apron carried on said members and having a portion adapted to engage the ground in advance of the cutter, and supporting connections between said portion of the apron and supporting frame including a lever, and means for causing differential movement between the gage and cutter including a link connecting said lever with the supporting frame.

2. In a topping machine the combination of a supporting frame, a floating frame comprising vertically spaced parallel members each pivoted at one end to the supporting frame, a cutter carried by the other end of said members, an endless gage apron pivotally supported on the floating frame and having a portion in position to engage the ground in advance of the cutter, a member mounted to oscillate on the floating frame, a connection between the ground engaging portion of the apron and said member, and another connection between said member and the supporting frame.

3. In a topping machine, the combination of a supporting frame, a floating frame comprising vertically spaced parallel members pivoted at one end to the supporting frame, a cutter carried by the other end of said members, an endless gage apron having its forward portion pivotally supported on the floating frame and its rear portion in position to engage the ground in advance of the cutter, a bell-crank mounted to oscillate on the floating frame, a connection between the rear portion of the apron and one arm of the bell-crank, a connection between the other arm of the bell-crank and the supporting frame, and means for adjusting said connection along said arm.

4. In a topping machine, the combination of a supporting frame, a floating frame comprising vertically spaced parallel members pivoted at one end to the supporting frame, a movable cutter having a shank journaled on the other end of said members, a gage apron having one end pivotally supported on the floating frame and its other end in position to engage the ground in advance of the cutter, a bell-crank mounted to oscillate on the floating frame, a connection between the gage and one arm of the bell-crank, a rock-arm mounted on the supporting frame, a link connecting the other arm of the bell-crank with the rock-arm, and an adjusting lever mounted on the supporting frame and connected to the rock-arm.

5. In a topping machine, the combination of a supporting frame, a floating frame comprising vertically spaced parallel members pivoted at their forward ends to the supporting frame, a housing pivotally connected to the rear ends of said members, an upright shaft journaled in said housing and provided with a cutter on its lower end, traction actuated means for oscillating said shaft and cutter, a gage adjustably mounted on said floating frame and adapted to engage the ground in advance of said cutter, and connecting means between the gage and supporting frame including means controlled by the movements of the floating frame for automatically adjusting the gage with respect to the cutter.

6. In a topping machine, the combination of a supporting frame, a floating frame comprising vertically spaced parallel members pivoted to the supporting frame at their forward ends, an upright member pivotally connecting the rear ends of said members and maintaining them in parallel relation, a cutter carried beneath the lower end of said upright member, a gage apron having a rear portion adapted to engage the ground in front of said cutter and having its forward portion carried on forwardly and downwardly extending rigid supports fixed to the rear ends of said parallel members, whereby the cutter and gage are held in true horizontal position during movement of the floating frame.

7. In a topping machine, the combination of a supporting frame, a floating frame comprising vertically spaced parallel members pivoted to the supporting frame at their forward ends, an upright member pivotally connecting the rear ends of said members and maintaining them in parallel relation, a cutter carried beneath the lower end of said upright member, a gage apron having its forward end pivoted on the ends of forwardly and downwardly extending supports fixed to the rear ends of said parallel members and having its rear end adapted to engage the ground in advance of said cutter, an adjusting link supporting the rear end of said apron and connected to an oscillating member on the floating frame, and an adjustable connection between said member and the supporting frame.

8. In a topping machine, the combination of a supporting frame, a vertically movable floating frame carried thereon, a housing supported on the floating frame and having an upright shaft journaled therein, a cutter on the lower end of said shaft having a horizontal knife edge, traction driven means on the supporting frame for oscillating said shaft and cutter, and an adjustable gage on said floating frame adapted to engage the ground in advance of said cutter.

9. In a topping machine, the combination of a supporting frame, a vertically movable floating frame carried thereon, a housing supported on the floating frame and having an upright shaft journaled therein, a cutter on the lower end of said shaft having a horizontal knife edge, and traction driven means on the supporting frame for oscillating said shaft and cutter.

10. In a topping machine, the combination of a supporting frame, a floating frame comprising vertically spaced parallel members pivoted to the supporting frame at their forward ends, an upright housing to which the rear ends of said members are pivoted, a shaft journaled in the housing, a cutter on the lower end of said shaft having a horizontal knife edge, and traction driven means on the supporting frame for oscillating said shaft and cutter.

11. In a topping machine, the combination of a supporting frame, a floating frame comprising vertically spaced parallel members pivoted at the forward ends thereof to the supporting frame and pivotally connected at the rear ends by a vertical frame section, a cutter carried by said vertical section, a movable gauge positioned ahead of the cutter and also carried by said vertical frame section, and means comprising pivotal connections between the gauge, the floating frame, and the supporting frame for causing differential movement of the gauge with respect to said vertical section of the floating frame.

12. In a topping machine, the combination of a supporting frame, a floating frame comprising vertically spaced parallel members pivoted at the forward ends thereof to the supporting frame and pivotally connected at the rear ends by a vertical frame section, a forwardly extending support secured to said vertical section, a rearwardly extended gauge member pivoted at its forward end to said support, means for pivotally supporting the rear end of said gauge, and a cutter carried by the vertical section of the floating frame.

13. In a topping machine, the combination of a supporting frame, a supplemental frame connected thereto for free movement vertically, a cutter carried by the supplemental frame, a gauge vertically movable carried by the supplemental frame in advance of the cutter, a bell crank mounted to oscillate on the floating frame, a supporting link pivotally connecting the gauge to one arm of the bell crank, a sleeve slidably adjustable on the other arm of the bell crank, and a link pivotally connecting the sleeve to the supporting frame.

14. In a topping machine, the combination of a supporting frame, a supplemental frame connected thereto for free movement vertically, a cutter carried by the supplemental frame, a gauge vertically movable carried by the supplemental frame in advance of the cutter, a bell crank mounted to oscillate on the floating frame, a supporting link pivotally connecting the gauge to one arm of the bell crank, an adjusting lever mounted on the supporting frame, and a pivotal connection between said lever and the other arm of the bell crank including means for adjusting the connection along the arm.

In testimony whereof I affix my signature.

ANDREW KOWALSKY.